(12) United States Patent
Rofougaran (10) Patent No.: US 8,874,049 B2
(45) Date of Patent: Oct. 28, 2014

(54) CONFIGURABLE TRANSCEIVER

(71) Applicant: Broadcom Corporation, Irvine, CA (US)

(72) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/725,035

(22) Filed: Dec. 21, 2012

(65) Prior Publication Data

US 2014/0155007 A1     Jun. 5, 2014

Related U.S. Application Data

(60) Provisional application No. 61/732,836, filed on Dec. 3, 2012.

(51) Int. Cl.
*H03C 1/62*     (2006.01)
*H04B 17/00*     (2006.01)
*H04B 1/40*     (2006.01)

(52) U.S. Cl.
CPC .................................. *H04B 1/40* (2013.01)
USPC ........................... 455/115.1; 455/129

(58) Field of Classification Search
USPC ............... 455/101–105, 129, 115.1
See application file for complete search history.

(56) References Cited

U.S. PATENT DOCUMENTS

2004/0219892 A1* 11/2004 Vaidyanathan et al. ...... 455/103
2011/0053522 A1    3/2011 Rofougaran et al.

OTHER PUBLICATIONS

Hsieh, "Wide Frequency Range Superheterodyne Receiver Design and Simulation", A Thesis in the Department of Electrical and Computer Engineering, Jan. 2011, 147 pgs., Concordia University.
Grini, "RF Basics, RF for Non-RF Engineers", MSP430 Advanced Technical Conference 2006, pp. 1-60, Texas Instruments Incorporated.
Youn, et al., "A RF Frong-End CMOS Transceiver for 2GHz Dual-Band Applications", Journal of Semiconductor Technology and Science, Jun. 2002, vol. 2, No. 2, pp. 147-155.
H. Miranda, "Receiver Design", EE144/EE245, 2007, pp. 1-24.
Abidi, "Direct-Conversion Radio Transceivers for Digital Communications", IEEE Journal of Solid-State Circuits, Dec. 1995, vol. 30, No. 12, pp. 1399-1410.
NAVAIR Electronic Warfare/Combat Systems, "Electronic Warfare and Radar Systems Engineering Handbook", Naval Air Warfare Center Weapons Division Point Mugu, California, Unclassified, Avionics Department 4.5, Apr. 1, 1997 with Rev. 4 of Jun. 1, 2012, 14 pgs.
"Testing and Troubleshooting Digital RF Communications Transmitter Designs", Agilent Technologies Wireless Test Solutions—Application Note 1313, Jan. 8, 2002, pp. 1-64, Agilent Technologies.

* cited by examiner

*Primary Examiner* — Christian Hannon
(74) *Attorney, Agent, or Firm* — McDermott Will & Emery LLP (57) ABSTRACT

A configurable transceiver may include a configurable receiver, a configurable transmitter, and a digital signal processor (DSP). One or more components of the configurable receiver and/or the configurable transmitter may be a block that includes an array of components, such as an array of amplifiers, an array of filters, etc. The DSP may determine a configuration of the configurable receiver that satisfies a bit error rate threshold and minimizes power consumption. The DSP may configure the blocks of the configurable receiver in accordance with the determined configuration of the configurable receiver. The DSP may receive an indication of a modulation scheme being used for transmitted data and may determine a configuration of the configurable transmitter for the modulation scheme that satisfies an error vector magnitude threshold and minimizes power consumption. The DSP may configure the blocks of the configurable transmitter in accordance with the determined configuration of the configurable transmitter.

20 Claims, 6 Drawing Sheets

FIG. 6

CONFIGURABLE TRANSCEIVER

CROSS-REFERENCE TO RELATED APPLICATIONS

The present application claims the benefit of U.S. Provisional Patent Application Ser. No. 61/732,836, entitled "Configurable Transceiver," filed on Dec. 3, 2012, which is hereby incorporated by reference in its entirety for all purposes.

TECHNICAL FIELD

The present description relates generally to a transceiver, and more particularly, but not exclusively, to a configurable transceiver that includes a digital signal processor (DSP).

BACKGROUND

Radio frequency (RF) transceivers include a receiver and a transmitter that may each include a number of different components, such as amplifiers, filters, oscillators, mixers, etc. The components are often individually designed to meet specific levels, such as power consumption, gain, loss, etc. The receiver and transmitter are designed to operate within certain thresholds based on the combination of the components that make up the receiver and transmitter, such as the amplifiers, filters, oscillators, mixers, etc. However, in some instances the receiver and/or transmitter may not need one or more of these components to operate at the highest level they are designed to perform. For example, a receiver and/or transmitter may be designed with an LC voltage controlled oscillator (VCO) even though in some (but not all) instances the receiver and/or transmitter may be able to tolerate the phase noise of a ring VCO, or a low power oscillator.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes details for the purpose of providing a thorough understanding of the subject technology. However, the subject technology is not limited to the details set forth herein and may be practiced using one or more implementations. In one or more instances, structures and components are shown in block diagram form in order to avoid obscuring the concepts of the subject technology.

Figure 1:
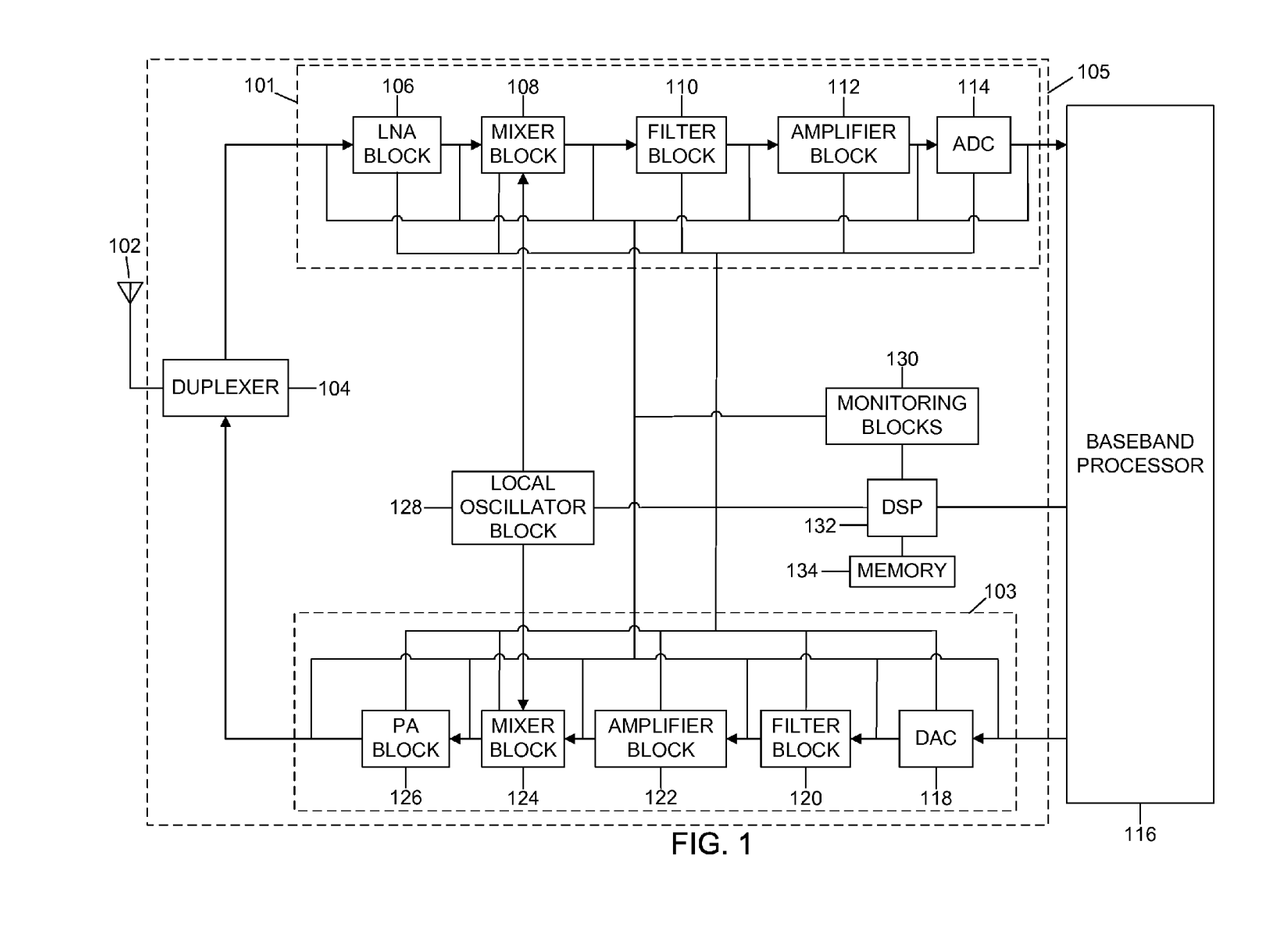
FIG. 1 illustrates an example configurable transceiver in accordance with one or more implementations.

FIG. 1 illustrates an example configurable transceiver 105 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided. For explanatory purposes the subject system is described in the context of the transceiver topology/architecture illustrated in FIG. 1. However, the subject system may be implemented in any transceiver topology/architecture and is not limited to the transceiver topology/architecture illustrated in FIG. 1.

The configurable transceiver 105 includes a configurable receiver 101, a configurable transmitter 103, a duplexer 104, a local oscillator block 128, one or more monitoring blocks 130, a digital signal processor (DSP) 132, and a memory 134. The configurable transceiver 105 may receive and transmit radio frequency (RF) signals through the antenna 102, and may transmit and receive RF signals to/from the baseband processor 116. The configurable receiver 101 includes a low noise amplifier (LNA) block 106, a mixer block 108, a filter block 110, an amplifier block 112, and an analog to digital converter (ADC) block 114. The configurable transmitter 103 includes a digital to analog converter (DAC) block 118, a filter block 120, an amplifier block 122, a mixer block 124, and a power amplifier (PA) block 126. In one or more implementations, the configurable transceiver 105 may include separate local oscillator blocks 128 for the configurable receiver 101 and the configurable transmitter 103.

Any of the blocks 106, 108, 110, 112, 114, 118, 120, 122, 124, and 126 of the configurable receiver 101 and configurable transmitter 103, and/or the local oscillator block 128, may be configurable blocks that include an array of components that have different architectures and/or different characteristics/parameters, and may also include programmable elements, such as resistors, capacitors, and/or any elements programmable by capacitance, current, and/or voltage sources. Alternatively, or in addition, any of the blocks 106, 108, 110, 112, 114, 118, 120, 122, 124, 126, and 128 may include a single component along with programmable elements, such as elements programmable by capacitance, current, and/or voltage sources. For example, the programmable elements may have biases that can be adjusted, such as by current sources, voltage sources, etc.

Any of the blocks 106, 108, 110, 112, 114, 118, 120, 122, 124, 126, and 128 may include one or more switches, such as a microelectromechanical system (MEMS) switch, that can be configured by the DSP 132 to select one of the components of the blocks 106, 108, 110, 112, and 128. In one or more implementations, any of the blocks 106, 108, 110, 112, 114, 118, 120, 122, 124, and 126 of the configurable receiver 101 and configurable transmitter 103 may be configured such that the components of the blocks 106, 108, 110, 112, 114, 118, 120, 122, 124, and 126 are bypassed. The blocks 106, 108, 110, 112, 114, 118, 120, 122, 124, and 126 of the configurable receiver 101 and configurable transmitter 103, and the local oscillator block 128, are discussed further below with respect to FIGS. 2 and 3.

The monitoring blocks 130 may be configured to monitor outputs of the blocks 106, 108, 110, 112, 114, 118, 120, 122, 124, and 126 of the configurable receiver 101 and configurable transmitter 103, and provide monitoring information to the DSP 132. For example, the monitoring blocks 130 may include a tap at an auxiliary path at the output of any of the blocks 106, 108, 110, 112, 114, 118, 120, 122, 124, and 126. Alternatively, or in addition, the monitoring blocks 130 may monitor any of the blocks 106, 108, 110, 112, 114, 118, 120, 122, 124, and 126 using any monitoring mechanism. The monitoring blocks 130 may include individual monitoring elements dedicated to the blocks 106, 108, 110, 112, 114, 118, 120, 122, 124, and 126, or the monitoring blocks 130 may include monitoring elements that are shared across one or more of the blocks 106, 108, 110, 112, 114, 118, 120, 122, 124, and 126. The monitoring blocks 130 may include ADCs to perform analog to digital conversion, mixers to perform frequency translation, one or more filters, and/or generally any other RF processing components.

In one or more implementations, the monitoring of any of the blocks 106, 108, 110, 112, and 114 of the configurable receiver 101 may be performed by any unused blocks 118, 120, 122, 124, and 126 of the configurable transmitter 103, and/or a combination of monitoring elements of the monitoring blocks 130 and any unused blocks 118, 120, 122, 124, and 126 of the configurable transmitter 103. Similarly, the monitoring of any of the blocks 118, 120, 122, 124, and 126 of the configurable transmitter 103 may be performed by any unused blocks 106, 108, 110, 112, and 114 of the configurable receiver 101, and/or a combination of monitoring elements of the monitoring blocks 130 and any unused blocks 106, 108, 110, 112, 114 of the configurable receiver 101.

The DSP 132 may be coupled to, and may configure, any of the blocks 106, 108, 110, 112, 114, 118, 120, 122, 124, 126, and 128 to select which component of any of the blocks 106, 108, 110, 112, 114, 118, 120, 122, 124, 126, and 128 is active at any given time and/or to program the programmable elements of any of the blocks 106, 108, 110, 112, 114, 118, 120, 122, 124, 126, and 128. For example, the DSP 132 may select components of any of the blocks 106, 108, 110, 112, 114, 118, 120, 122, 124, 126, and 128 based on the monitoring information received from the monitoring blocks 130, such that the configurable receiver 101 and/or the configurable transmitter 103 can achieve identified system performances with minimal power consumption. In the instance of the configurable receiver 101, the DSP 132 may measure system performance based on the bit error rate (BER) of a received signal, while in the instance of the configurable transmitter 103, the DSP 132 may measure system performance based on the error vector magnitude (EVM).

In one or more implementations, the DSP 132 may utilize the memory 134 to store a lookup table. The lookup table may store the configuration of blocks 118, 120, 122, 124, and 126 of the configurable transmitter 103, and/or of the local oscillator block 128, that achieves the desired system performance and the minimal power consumption for given operating parameters, such as the modulation scheme of the data signal being transmitted by the configurable transmitter 103, ambient temperature, interference parameters, or generally any operating parameters. For example, for high level modulations, the DSP 132 may configure the mixer block 124 to select a passive mixer, rather than an active mixer, because linearity may be more important than noise for system performance. The lookup table of the memory 134 may also store the configuration of the blocks 106, 108, 110, 112, and 114 of the configurable receiver 101 that achieves an identified system performance and the minimal power consumption for given operating parameters, such as the modulation scheme of the data signal being received by the configurable receiver 101, ambient temperature, interference parameters, or generally any operating parameters.

In one or more implementations, a configuration of the configurable transmitter 103 may indicate the individual components of the blocks 118, 120, 122, 124, 126 and/or 128 that should be selected for the configuration, if any, along with information pertaining to programming the programmable elements of the blocks 118, 120, 122, 124, 126, and/or 128 for the configuration, if any. Similarly, a configuration of the configurable receiver 101 may indicate the components of the blocks 106, 108, 110, 112, 114, and/or 128 that should be selected for the configuration, if any, along with information pertaining to programming the programmable elements of the blocks 106, 108, 110, 112, 114, and/or 128 for the configuration, if any.

At start-up, the DSP 132 may perform an initialization process that includes testing various configurations of the configurable transmitter 103 and/or the configurable receiver 101 for various operating parameters, e.g. using a data signal modulated with one or more modulation schemes. For example, the DSP 132 may generate data modulated with a modulation scheme and may pass a signal carrying the modulated data through various configurations of the blocks 118, 120, 122, 124, and 126 of the configurable transmitter 103, such as several of the possible configurations of the blocks 118, 120, 122, 124, and 126 of the configurable transmitter 103. For example the DSP 132 may inject the signal into the DAC block 118 of the configurable transmitter 103. The DSP 132 may receive monitoring information from the monitoring blocks 130 for the configurations and may determine the configuration of the configurable transmitter 103 that achieves an identified system performance, e.g. an identified EVM, with the minimal power consumption. For example, the configurable transmitter 103 may be qualified, or certified, to perform below a particular EVM threshold, e.g. for a given mode of operation. Alternatively, the DSP 132 may determine the configuration of the configurable transmitter 103 that achieves an optimal system performance, e.g. a minimum EVM, with the minimal power consumption.

The DSP 132 may repeat this process for any modulation schemes for which data is expected to be transmitted by the configurable transmitter 103 during operation. In one or more implementations, the baseband processor 116 may provide the modulation schemes to be used for the configuration testing to the DSP 132. For any of the tested modulation schemes, the DSP 132 may store, in the memory 134, an association between the modulation scheme and the configuration of the blocks 118, 120, 122, 124, and 126 of the configurable transmitter 103 that achieves the identified system performance with the minimal power consumption for the modulation scheme.

With respect to the configurable receiver 101, the DSP 132 may test various configurations of the blocks 106, 108, 110, 112, 114 of the configurable receiver 101 by passing a signal carrying modulated data through the configurable receiver 101. For example, the DSP 132 may inject a signal carrying modulated data into the LNA block 106, a signal that was passed by the DSP 132 through the configurable transmitter 103 may leak through the package to the configurable receiver 101, or the antenna 102 may receive a signal through the air that was passed through the configurable transmitter 103 by the DSP 132. The DSP 132 may receive monitoring information from the monitoring blocks 130 for the various configurations of the configurable receiver 101, and the DSP 132 may determine the configuration of the configurable receiver 101 that achieves an identified system performance, e.g. an identified BER, with the minimal power consumption. For example, the configurable receiver 101 may be qualified, or certified, to perform below a BER threshold, e.g. for a given mode of operation. Alternatively, the DSP 132 may determine the configuration of the configurable receiver 101 that achieves an optimal system performance, e.g. a minimum BER, with the minimal power consumption. The DSP 132 may store the determined configuration of the configurable receiver 101 in the memory 134, such as in a lookup table.

In one or more implementations, the configurable receiver 101 may receive data that is modulated using the same modulation scheme as the data transmitted by the configurable transmitter 103. In these one or more implementations, the DSP 132 may determine the configuration of the configurable receiver 101 that achieves the identified system performance, e.g. an identified BER with the minimal power consumption for the modulation schemes that are used by the configurable transmitter 103. The DSP 132 may store, in the memory 134, associations between the modulation schemes and the configurations of the configurable receiver 101 that achieves the identified system performance with the minimal power consumption for the modulation schemes.

Once the configurable transceiver 105 is in operation, e.g. transmitting/receiving RF signals, the baseband processor 116 may provide an indication of the modulation scheme being used to modulate transmitted data to the DSP 132, and the DSP 132 may retrieve the configuration of the blocks 118, 120, 122, 124, and 126 of the configurable transmitter 103, and/or the local oscillator block 128, that corresponds to the modulation scheme, e.g. from the lookup table stored in the memory 134. The DSP 132 may then configure the blocks 118, 120, 122, 124, and 126 of the configurable transmitter 103, and/or the local oscillator block, to select components and/or program programmable elements in accordance with the configuration retrieved from the lookup table.

During operation of the configurable transceiver 105, the DSP 132 may continually receive monitoring information from the monitoring blocks 130, and the DSP 132 may update the lookup table in the memory 134 based on received monitoring information. In one or more implementations, the DSP 132 may receive information related to environmental parameters, such as ambient temperature. For example, the DSP 132 may receive information related to environmental parameters from the baseband processor 116 and/or the DSP 132 may be coupled to one or more sensors that provide environmental parameters. In these one or more implementations, the DSP 132 may determine when a change in an environmental parameter, such as temperature, satisfies an environmental change threshold. If the DSP 132 determines that a change in any environmental parameter satisfies the environmental change threshold, the DSP 132 may repeat the initialization process performed at startup to update the values stored in the lookup table for the configurable receiver 101 and/or the configurable transmitter 103. The DSP 132 may then change the configurations of the configurable receiver 101 and/or the configurable transmitter 103 in accordance with any changes stored in the lookup table.

In one or more implementations, the DSP 132 may only change the selected component of any of the blocks 106, 108, 110, 112, 114, 118, 120, 122, 124, and 126 of the configurable receiver 101 and configurable transmitter 103, and/or the local oscillator block 128, while the configurable transceiver 105 is operating if there is sufficient time for such a change. However, the DSP 132 may be able to fine tune the blocks 106, 108, 110, 112, 114, 118, 120, 122, 124, and 126 of the configurable receiver 101 and configurable transmitter 103, and/or the local oscillator block 128, while the configurable transceiver 105 is operating, e.g. by programming the programmable elements of the blocks 106, 108, 110, 112, 114, 118, 120, 122, 124, 126, and 128.

Figure 2:
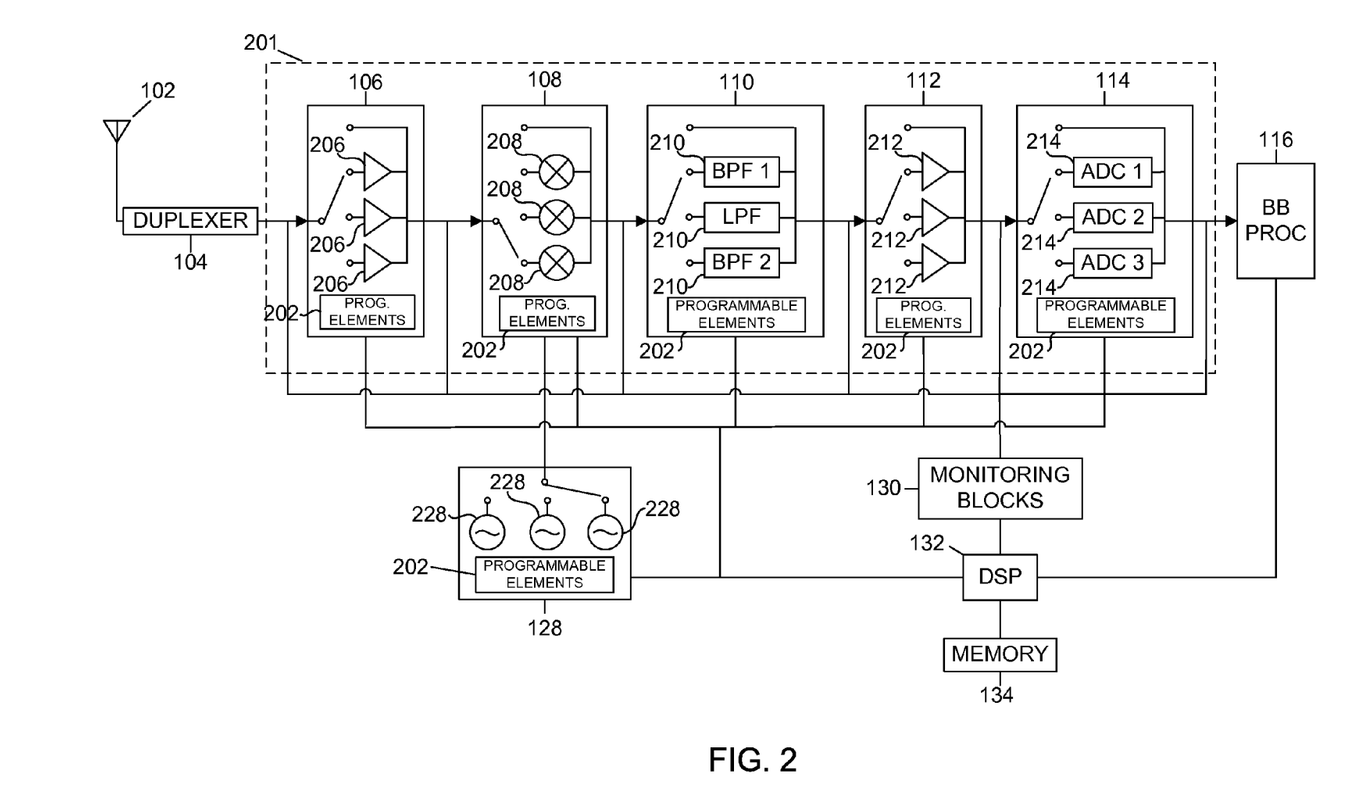
FIG. 2 illustrates an example configurable receiver of an example configurable transceiver in accordance with one or more implementations.

FIG. 2 illustrates an example configurable receiver 201 of an example configurable transceiver in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided. For explanatory purposes the subject system is described in the context of the receiver topology/architecture illustrated in FIG. 2. However, the subject system may be implemented in any receiver topology/architecture and is not limited to the receiver topology/architecture illustrated in FIG. 2.

The configurable receiver 201 may include a low noise amplifier (LNA) block 106, a mixer block 108 that is coupled to a local oscillator block 128, a filter block 110, an amplifier block 112, and an analog to digital converter (ADC) block 114. The blocks 106, 108, 110, 112, and 114, and 128 may include switches, such as MEMS switches, and an array of components 206, 208, 210, 212, 214, and 228. The switches of any of the blocks 106, 108, 110, 112, 114, and 128 may be configured by the DSP 132 to select, or activate, one of the components 206, 208, 210, 212, 214, and 228 of the blocks 106, 108, 110, 112, 114, and 128, or to bypass the blocks 106, 108, 110, 112, and 114.

The LNA block 106 includes programmable elements 202 and an array of LNAs 206 that have different designs, such as different S-parameter-based designs, and/or LNAs 206 that have different characteristics/parameters, such as different gains, different noise figures, and different non-linearity and/or impedance matching. The mixer block 108 includes programmable elements 202 and an array of different types of mixers 208, such as active mixers, passive mixers, etc., and/or mixers 208 having different characteristics/parameters, such as different gains and/or different noise figures. The local oscillator block 128 includes programmable elements 202 and an array of different types of local oscillators 228, such as LC VCOs, ring VCOs, etc., and/or local oscillators 228 having different characteristics/parameters, such as VCOs operating at different frequencies. The filter block 110 includes programmable elements 202 and an array of different types of filters 210, such as low pass filters, high pass filters, bandpass filters, notch filters, etc. The amplifier block 112 includes programmable elements 202 and an array of amplifiers 212 having different characteristics/parameters, such as different gains, different bandwidths, different efficiencies, different linearity, etc. The ADC block 114 includes programmable elements 202 and an array of different types of ADCs 214, such as direct-conversion ADCs, successive-approximation ADCs, ramp-compare ADCs, etc., and/or ADCs 214 having different characteristics/parameters, such as different resolutions, different quantization errors, different non-linearity, etc.

In one or more implementations, any of the blocks 106, 108, 110, 112, 114, and 128 may only include a single component and programmable elements 202 and/or any of the blocks 106, 108, 110, 112, 114, and 128 may not include programmable elements 202. In one or more implementations, a receiver topology/architecture may include additional blocks that are not described with respect to FIG. 2. In these one or more implementations, the additional blocks may include an array of one or more components and may also include programmable elements 202, similar to the blocks 106, 108, 110, 112, 114, and 128 that are described with respect to FIG. 2. Generally any component utilized in any receiver topology/architecture may be replaced with a block that includes an array of different types/forms of the given component, and may also include the programmable elements 202.

In one or more implementations, there may be multiple concurrent receive paths through the configurable receiver 201 that utilize different components 206, 208, 210, 212, and 214 of the array of components of the blocks 106, 108, 110, 112, and 114 of the configurable receiver 201, and/or different local oscillators 228 of the local oscillator block 128. In these implementations, the blocks 106, 108, 110, 112, 114, and 128 may include multiple switches, such as a switch for each path.

Figure 3:
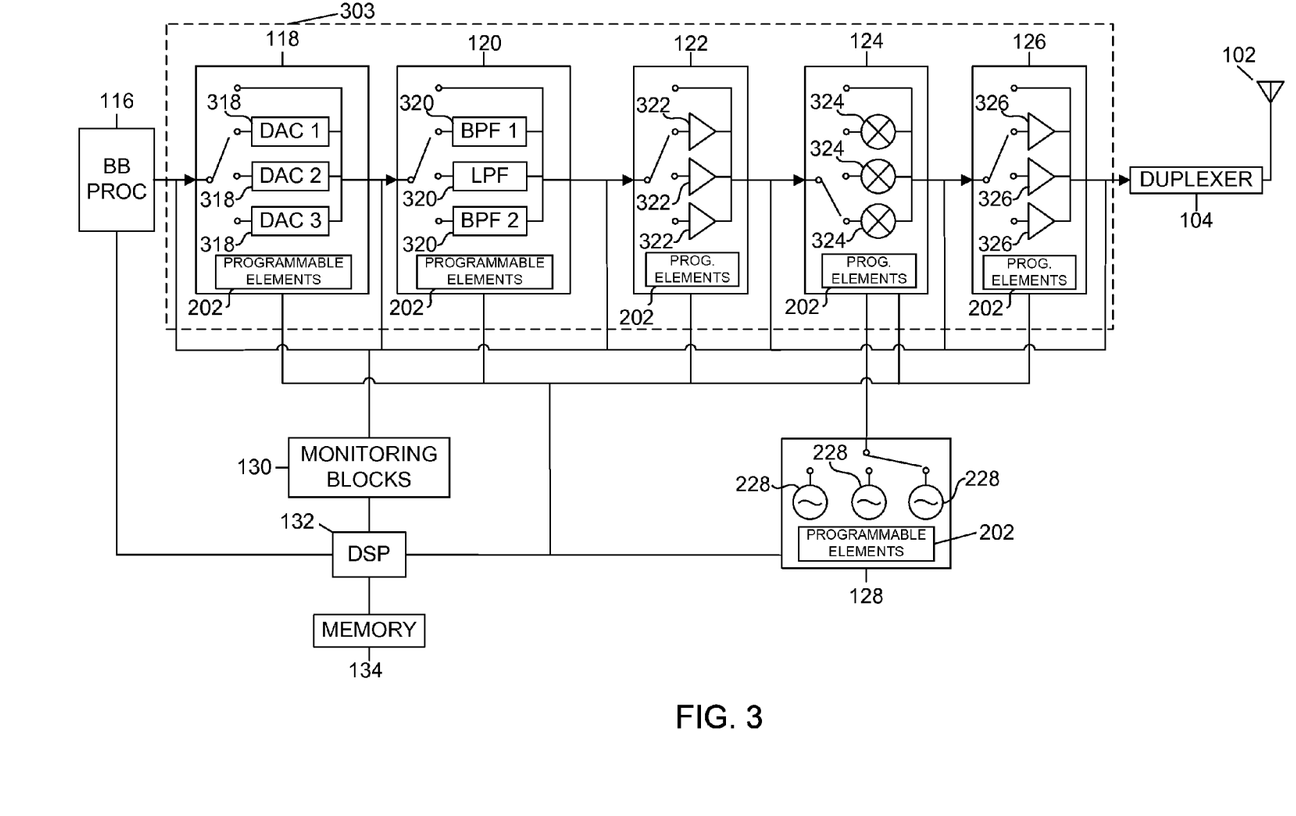
FIG. 3 illustrates an example configurable transmitter of an example configurable transceiver in accordance with one or more implementations.

FIG. 3 illustrates an example configurable transmitter 303 of an example configurable transceiver in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided. For explanatory purposes the subject system is described in the context of the transmitter topology/architecture illustrated in FIG. 3. However, the subject system may be implemented in any receiver topology/architecture and is not limited to the receiver topology/architecture illustrated in FIG. 3.

The configurable transmitter 303 may include a DAC block 118, a filter block 120, an amplifier block 122, a mixer block 124 that is coupled to a local oscillator block 128, and a PA block 126. The blocks 118, 120, 122, 124, 126, and 128 may include switches, such as MEMS switches, and an array of components 318, 320, 322, 324, 326, and 228. The switch of any of the blocks 118, 120, 122, 124, 126, and 128 may be configured by the DSP 132 to select, or activate, one of the components 318, 320, 322, 324, 326, and 228 of the blocks 106, 108, 110, 112, 114, and 128, or to bypass the blocks 118, 120, 122, 124, and 126.

The DAC block 118 includes programmable elements 202 and an array of different types of DACs 318, such as a pulse-width modulator DAC, oversampling DAC, binary weighted DACs, etc., and/or DACs 318 having different characteristics/parameters, such as different resolutions, different sampling rates, etc. The filter block 120 includes programmable elements 202 and an array of different types of filters 320, such as low pass filters, high pass filters, bandpass filters, notch filters, etc. The amplifier block 122 includes programmable elements 202 and an array of amplifiers 322 that have different characteristics/parameters, such as different gains, different bandwidths, different efficiencies, different linearity, etc. The mixer block 124 includes programmable elements 202 and an array of different types of mixers 324, such as active mixers, passive mixers, etc., and/or mixers 324 having different characteristics/parameters, such as different gains and/or different noise figures. The local oscillator block 128 includes programmable elements 202 and an array of different types of local oscillators 228, such as LC VCOs, ring VCOs, etc., and/or local oscillators 228 having different characteristics/parameters, such as VCOs operating at different frequencies. The PA block 126 includes programmable elements 202 and an array of PAs 326 that have different characteristics/parameters, such as different gains, different bandwidths, different efficiencies, different linearity, etc.

In one or more implementations, any of the blocks 118, 120, 122, 124, 126, and 128 may include a single component and the programmable elements 202 and/or any of the blocks 118, 120, 122, 124, 126, and 128 may not include the programmable elements 202. In one or more implementations, a transmitter topology/architecture may include additional blocks that are not described with respect to FIG. 3. In these one or more implementations, the additional blocks may include an array of one or more components and may also include programmable elements 202, similar to the blocks 118, 120, 122, 124, 126, and 128 that are described with respect to FIG. 3. Generally any component utilized in any transmitter topology/architecture may be replaced with a block that includes an array of different types/forms of the given component and may also include the programmable elements 202.

In one or more implementations, there may be multiple concurrent transmit paths through the configurable transmitter 303 that utilize different components 318, 320, 322, 324, and 326 of the array of components of the blocks 118, 120, 122, 124, and 126 of the configurable transmitter 303 and/or different local oscillators 228 of the local oscillator block 128. In these implementations, the blocks 118, 120, 122, 124, 126, and 128 may include multiple switches, such as a switch for each path.

Figure 4:
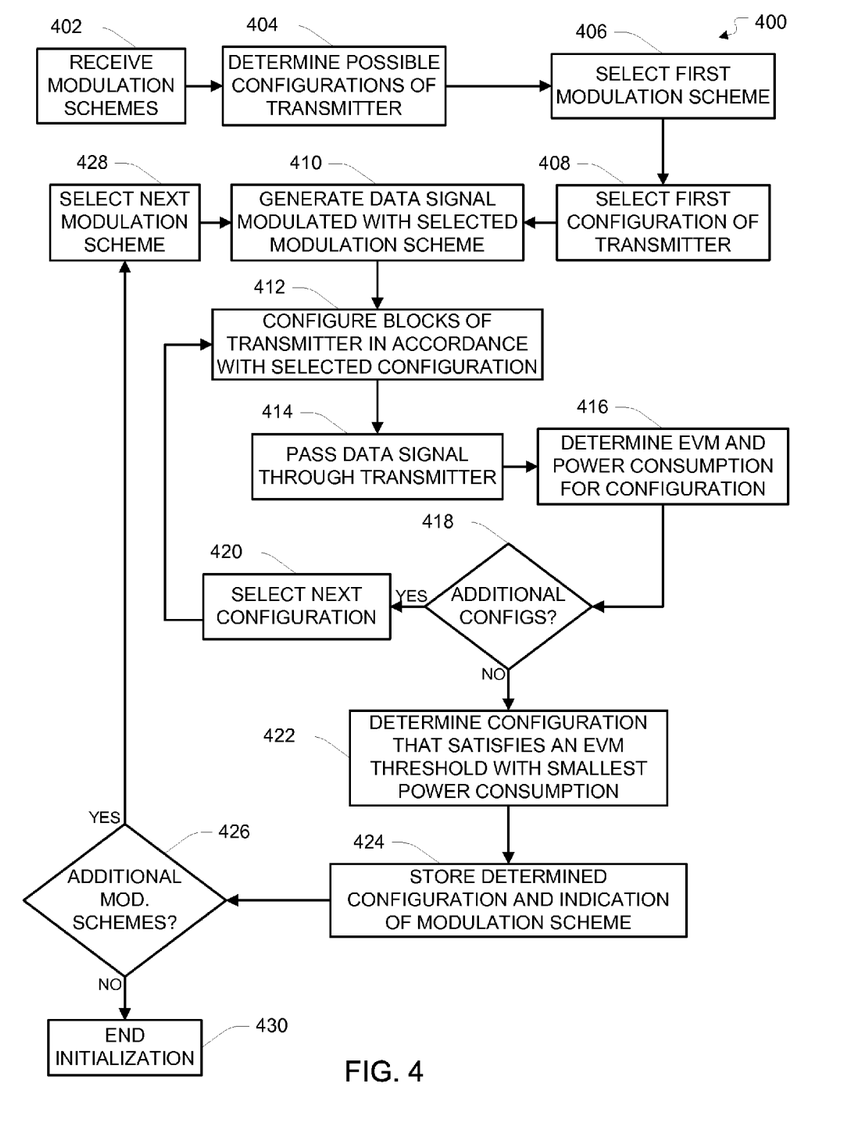
FIG. 4 illustrates a flow diagram of an example process for initializing a configurable transmitter of a configurable transceiver in accordance with one or more implementations.

FIG. 4 illustrates a flow diagram of an example process 400 for initializing a configurable transmitter 303 of a configurable transceiver 105 in accordance with one or more implementations. For explanatory purposes, example process 400 is described herein with reference to the example configurable transmitter 303 of FIG. 3 and the example configurable transceiver 105 of FIG. 1; however, example process 400 is not limited to the example configurable transmitter 303 of FIG. 3 or the example configurable transceiver 105 of FIG. 1. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

The DSP 132 of a configurable transceiver 105 receives an indication of modulation schemes used by the baseband processor 116 (402). For example, the baseband processor 116 may communicate the modulation schemes to the DSP 132. The DSP 132 determines the possible configurations of a reconfigurable transmitter 303 of the configurable transceiver 105 (404). For example, if the blocks 118, 120, 122, 124, and 126 of the configurable transmitter 303, and/or the local oscillator block 128, include arrays of components 318, 320, 322, 324, 326, and 228, the DSP 132 may determine a separate configuration for each combination of the different arrays of components 318, 320, 322, 324, 326, and 228. Alternatively, or in addition, the DSP 132 may determine a separate configurations for the different programming possibilities of the programming elements 202 of the blocks 118, 120, 122, 124, 126, and 128, such as for each of the combinations of the different arrays of components 318, 320, 322, 324, 326, and 228.

The DSP 132 selects the first modulation scheme from the received modulation schemes (406), and the DSP 132 selects the first determined configuration of the configurable transmitter 303 (408). The DSP 132 generates a data signal that is modulated using the selected modulation scheme (410). The DSP 132 configures the blocks 118, 120, 122, 124, and 126 of the configurable transmitter 303, and/or the local oscillator block 128, in accordance with the selected configuration (412). For example, the DSP 132 may transmit a signal to the filter block 120 that causes the switch of the filter block 120 to select the filter 320 that is indicated in the selected configuration, and/or the DSP 132 may transmit a signal that programs one or more of the programmable elements 202 of the filter block 120, as indicated in the selected configuration.

The DSP 132 passes the generated signal through the configurable transmitter 303 (414). For example, the DSP 132 may inject the generated signal into the DAC block 118. The DSP 132 determines the EVM and power consumption for the configuration (416). For example, the DSP 132 may receive monitoring information from the monitoring blocks 130, e.g. during or after the signal is injected through the configurable transmitter 303, and the DSP 132 may process the monitoring information to determine the EVM for the configuration. The DSP 132 determines whether there are any additional configurations that have not been tested (418). If the DSP 132 determines that there are additional configurations that have not been tested (418), the DSP 132 selects the next configuration to be tested (420) and repeats the testing process (412-416) for the next configuration.

If the DSP 132 determines that there are no additional configurations to be tested (418), the DSP 132 determines the configuration of the configurable transmitter 303 that has an EVM that satisfies an EVM threshold and has the smallest power consumption (422). In one or more implementations, the configurable transmitter 303 may be qualified or certified to operate below a maximum EVM threshold. Thus, in these one or more implementations the DSP 132 determines the configuration of the configurable transmitter 303 that satisfies the maximum EVM threshold with the smallest power consumption. The DSP 132 stores the determined configuration and an association with the modulation scheme in the memory 134 (424).

The DSP 132 determines whether there are additional modulation schemes that have not been tested (426). If the DSP 132 determines that there are additional modulation schemes that have not been tested (426), the DSP 132 selects the next modulation scheme to be tested (428), and repeats the testing process (410-424) for the next modulation scheme. If the DSP 132 determines that there are no additional modulation schemes to be tested (426), the DSP 132 ends the initialization process (430). In one or more implementations, the example process 400 can also be performed for initializing a configurable receiver 201 of the configurable transceiver 105, e.g. concurrently or separately from initializing the configurable transmitter 303. In one or more implementations, the example process 400 may be performed for initializing the configurable transmitter 303 and/or the configurable receiver 201 using other operating parameters other than the modulation schemes, e.g. ambient temperature, etc.

Figure 5:
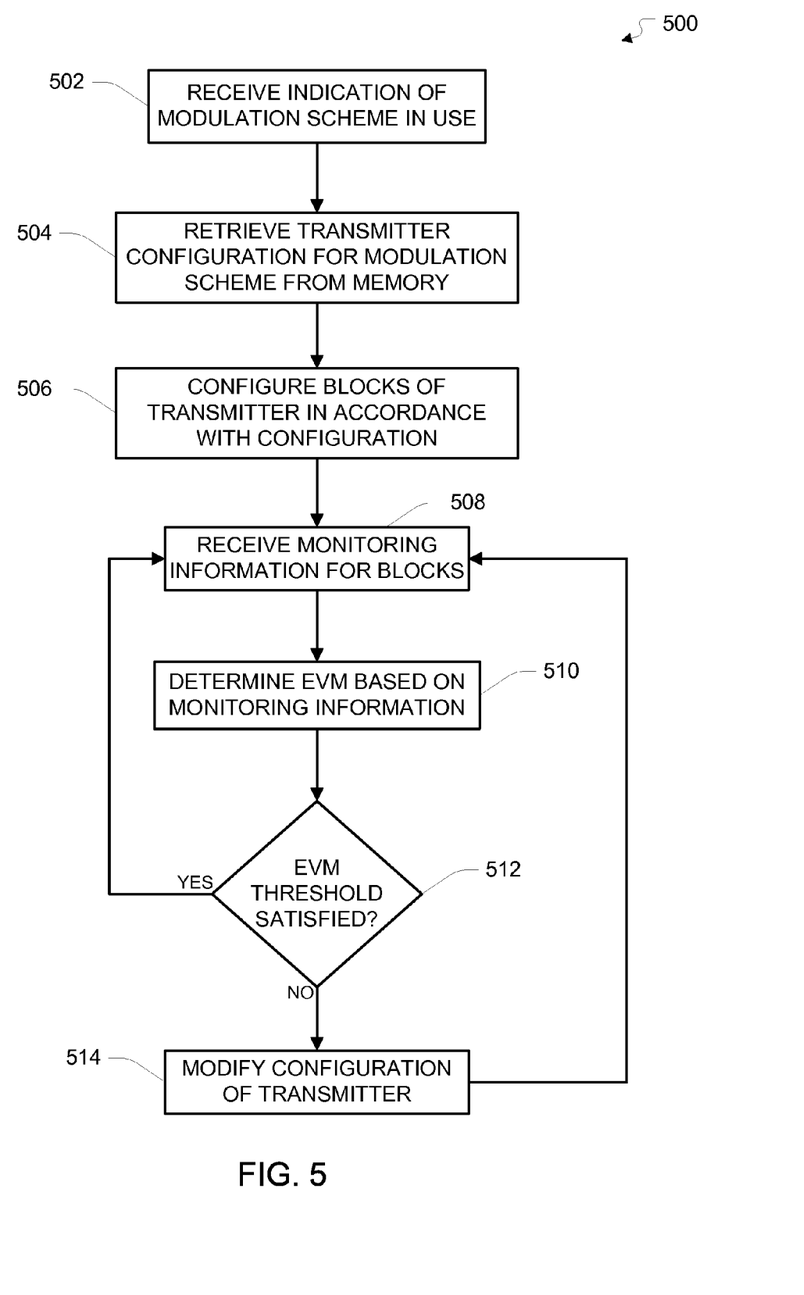
FIG. 5 illustrates a flow diagram of an example process of configuring a configurable transmitter of a configurable transceiver in accordance with one or more implementations.

FIG. 5 illustrates a flow diagram of an example process 500 of configuring a configurable transmitter 303 of a configurable transceiver 105 in accordance with one or more implementations. For explanatory purposes, example process 500 is described herein with reference to the example configurable transmitter 303 of FIG. 3 and the example configurable transceiver 105 of FIG. 1; however, example process 500 is not limited to the example configurable transmitter 303 of FIG. 3 or the example configurable transceiver 105 of FIG. 1. Further for explanatory purposes, the blocks of example process 500 are described herein as occurring in serial, or linearly. However, multiple blocks of example process 500 may occur in parallel. In addition, the blocks of example process 500 need not be performed in the order shown and/or one or more of the blocks of example process 500 need not be performed.

The DSP 132 receives an indication of the modulation scheme that will be used to modulate data transmitted by the configurable transmitter 303 (502). For example, the DSP 132 may receive the indication of the modulation scheme from the baseband processor 116. The DSP 132 retrieves from the memory 134 the configuration of the configurable transmitter 303 that is associated with the indicated modulation scheme (504). For example, the DSP 132 may provide an indication of the modulation scheme to a lookup table and the lookup table may return the configuration of the configurable transmitter 303 that is associated with the modulation scheme in the lookup table.

The DSP 132 configures the blocks 118, 120, 122, 124, and 126 of the configurable transmitter 303, and/or the local oscillator block 128, in accordance with the retrieved configuration (506). For example, the DSP 132 may transmit a signal to the filter block 120 that causes the switch of the filter block 120 to select the filter 320 that is indicated in the retrieved configuration, and/or the DSP 132 may transmit a signal that programs one or more of the programmable elements 202 of the filter block 120, in accordance with the retrieved configuration.

The DSP 132 receives monitoring information from the monitoring blocks 130 for the blocks 118, 120, 122, 124, and 126 of the configurable transmitter 303 (508). For example, the monitoring blocks 130 may be coupled to auxiliary paths at the outputs of one or more of the blocks 118, 120, 122, 124, and 126, and the monitoring blocks 130 may receive the signals at the outputs of one or more of the blocks 118, 120, 122, 124, and 126 via the auxiliary paths. The DSP 132 determines the EVM for the configurable transmitter 303 based on the received monitoring information (510), and determines whether the determined EVM satisfies an EVM threshold (512). For example, the configurable transmitter 303 may be qualified or certified to operate below a maximum EVM, which may be the EVM threshold. If the EVM threshold is satisfied (512), the DSP 132 then repeats the steps of receiving monitoring information from the monitoring blocks 130 (508), and determining the EVM for the configurable transmitter 303 based on the received monitoring information (510).

If the EVM threshold is not satisfied (512), the DSP 132 modifies the configuration of the configurable transmitter 303 (514). For example, if the configurable transmitter 303 is presently operating, e.g. transmitting a signal, the DSP 132 may program one or more of the programmable elements 202 of one or more of the blocks 118, 120, 122, 124, and 126 of the configurable transmitter 303 and/or the local oscillator block 128, such as by adjusting biases of the programmable elements 202, in order to modify the configuration of the configurable transmitter 303. Alternatively, or in addition, the configurable transmitter 303 is not presently operating, the DSP 132 may repeat the initialization process for the configurable transmitter 303, e.g. as described above with respect to FIG. 4. The DSP 132 then repeats the steps of receiving monitoring information from the monitoring blocks 130 (508), and determining the EVM for the configurable transmitter 303 based on the received monitoring information (510).

Figure 6:
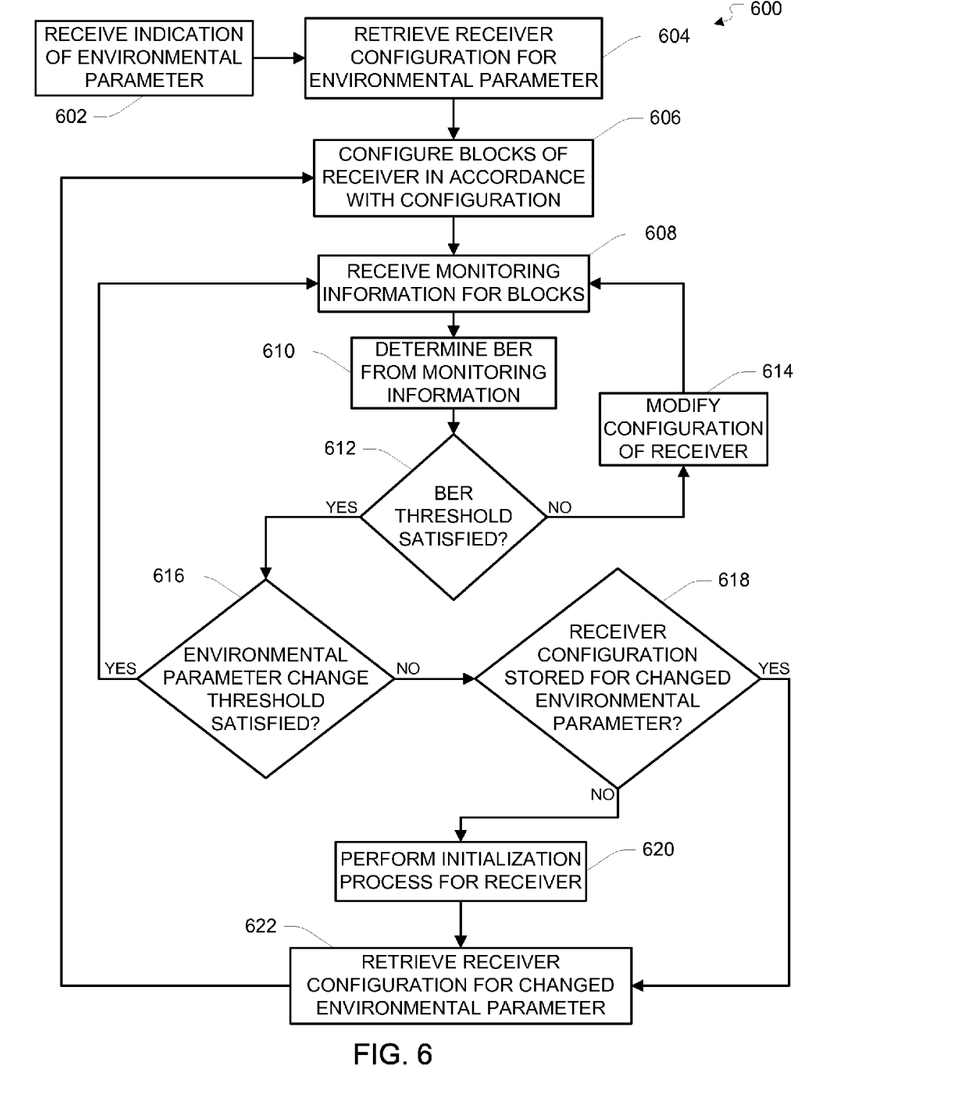
FIG. 6 illustrates a flow diagram of an example process of configuring a configurable receiver of a configurable transceiver in accordance with one or more implementations.

FIG. 6 illustrates a flow diagram of an example process 600 of configuring a configurable receiver 201 of a configurable transceiver 105 in accordance with one or more implementations. For explanatory purposes, example process 600 is described herein with reference to the example configurable receiver 201 of FIG. 2 and the example configurable transceiver 105 of FIG. 1; however, example process 600 is not limited to the example configurable receiver 201 of FIG. 2 or the example configurable transceiver 105 of FIG. 1. Further for explanatory purposes, the blocks of example process 600 are described herein as occurring in serial, or linearly. However, multiple blocks of example process 500 may occur in parallel. In addition, the blocks of example process 600 need not be performed in the order shown and/or one or more of the blocks of example process 600 need not be performed.

The DSP 132 receives an indication of a value of an environmental parameter, such as ambient temperature (602). For example, the baseband processor 116 may provide the DSP 132 with an indication of a value of the ambient temperature. The DSP 132 retrieves the receiver configuration for the indicated value of the environmental parameter from the memory 134 (604). For example, the DSP 132 may have previously performed the initialization process for the configurable receiver 201 with respect to the indicated value of the environmental parameter, and/or with respect to a ranges of values that includes the indicated value of the environmental parameter, such as the initialization process described above with respect to FIG. 4. In one or more implementations, if the DSP 132 determines that there is not a configuration of the configurable receiver 201 stored in the memory 134 for the indicated value of the environmental parameter, or for a range that includes the indicated value of the environmental parameter, the DSP 132 may perform the initialization process with respect to the received environmental parameter, such as the initialization process described above with respect to FIG. 4.

The DSP 132 configures the blocks 106, 108, 110, 112, and 114 of the configurable receiver 201, and/or the local oscillator block 128, in accordance with the retrieved configuration (606). For example, the DSP 132 may transmit a signal to the filter block 110 that causes the switch of the filter block 110 to select the filter 210 that is indicated in the retrieved configuration, and/or the DSP 132 may transmit a signal that programs one or more of the programmable elements 202 of the filter block 110, in accordance with the retrieved configuration. If the BER threshold is not satisfied (612), the DSP 132 modifies the configuration of the configurable receiver 201 (614). For example, if the configurable receiver 201 is presently operating, e.g. receiving a signal, the DSP 132 may program one or more of the programmable elements 202 of one or more of the blocks 106, 108, 110, 112, 114 of the configurable receiver 201 and/or the local oscillator block 128, such as by adjusting biases of the programmable elements 202, in order to modify the configuration of the configurable receiver 201. Alternatively, or in addition, the configurable receiver 201 is not presently operating, the DSP 132 may repeat the initialization process for the configurable receiver 201, e.g. as described above with respect to FIG. 4. The DSP 132 then repeats the steps of receiving monitoring information from the monitoring blocks 130 (608), and determining the BER for the configurable receiver 201 based on the received monitoring information (610).

The DSP 132 receives monitoring information from the monitoring blocks 130 for the blocks 106, 108, 110, 112, and 114 of the configurable receiver 201 (508). For example, the monitoring blocks 130 may be coupled to auxiliary paths at the outputs of one or more of the blocks 106, 108, 110, 112, and 114, and the monitoring blocks 130 may receive the signals at the outputs of one or more of the blocks 106, 108, 110, 112, and 114 via the auxiliary paths. The DSP 132 determines the BER for the configurable receiver 201 based on the received monitoring information (610), and determines whether the determined BER satisfies a BER threshold (612). For example, the configurable transmitter 303 may be qualified or certified to operate below a maximum BER, which may be the BER threshold.

If the DSP 132 determines that the BER threshold is satisfied (612), the DSP 132 determines whether an environmental parameter change threshold is satisfied (616). For example, the DSP 132 may periodically receive updated values for the environmental parameter, e.g. from the baseband processor 116. The DSP 132 may determine the absolute value of the difference between the updated value of the environmental parameter and the previously indicated value of the environmental parameter. In one or more implementations, the environmental parameter change threshold may be satisfied if the absolute value of the difference is less than the environmental parameter change threshold. Conversely, the environmental change parameter may not be satisfied if the absolute value of the difference is greater than or equal to the environmental parameter change threshold.

If the DSP 132 determines that the environmental parameter change threshold is satisfied (616), the DSP 132 repeats the steps of receiving monitoring information from the monitoring blocks 130 (608), and determining the BER for the configurable receiver 201 based on the received monitoring information (610). If the DSP 132 determines that the environmental parameter change threshold is not satisfied (616), the DSP 132 determines whether a configuration of the configurable receiver 201 is stored in the memory 134 for the updated value of the environmental parameter. If the DSP 132 determines that a configuration of the configurable receiver 201 exists in the memory (618), the DSP 132 retrieves the configuration (622), configures the blocks 106, 108, 110, 112, and 114 of the configurable receiver 201, and/or the local oscillator block 128, in accordance with the retrieved configuration (606), and repeats the steps of monitoring the blocks 106, 108, 110, 112, and 114 of the configurable receiver 201 (610-612).

If the DSP 132 determines that a configuration of the configurable receiver 201 does not exist in the memory (618) for the updated value of the environmental parameter, the DSP 132 may repeat the initialization process for the configurable receiver 201 (620), e.g. as described above with respect to FIG. 4, such as when the configurable receiver 201 is not operating. The DSP 132 retrieves the configuration (622), configures the blocks 106, 108, 110, 112, and 114 of the configurable receiver 201, and/or the local oscillator block 128, in accordance with the retrieved configuration (606), and repeats the steps of monitoring the blocks 106, 108, 110, 112, and 114 of the configurable receiver 201 (610-612).

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry.

Some implementations can include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Some implementations can be performed by a microprocessor or multi-core processors that execute software. Some implementations can be performed by one or more integrated circuits, such as application specific integrated circuits (ASICs) or field programmable gate arrays (FPGAs). In some implementations, such integrated circuits can execute instructions that are stored on the circuit itself.

Many of the above-described features and applications may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waveforms and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A configurable transmitter apparatus, comprising:
   a plurality of transmitter blocks;
   a memory configured to store a plurality of configurations of the plurality of transmitter blocks, each configuration being associated with one of a plurality of modulation schemes;
   a plurality of monitoring blocks coupled to the plurality of transmitter blocks and to a digital signal processor, the plurality of monitoring blocks configured to monitor the plurality of transmitter blocks and provide monitoring information to the digital signal processor; and
   the digital signal processor configured to receive an indication of a modulation scheme, configure the plurality of transmitter blocks in accordance with the configuration stored in the memory that is associated with the indicated modulation scheme, and adjust the plurality of transmitter blocks based at least in part on the monitoring information provided by the plurality of monitoring blocks.

2. The configurable transmitter apparatus of claim 1, wherein each of the plurality of transmitter blocks comprises a plurality of transmitter components and each configuration of the plurality of configurations is indicative of one of the plurality of transmitter components of each of the plurality of transmitter blocks.

3. The configurable transmitter apparatus of claim 2, wherein the plurality of transmitter blocks comprise at least one power amplifier block for which the plurality of transmitter components comprise a plurality of different power amplifiers, at least one mixer block for which the plurality of transmitter components comprise a plurality of different mixers, and at least one local oscillator block for which the plurality of transmitter components comprise a plurality of different local oscillators.

4. The configurable transmitter apparatus of claim 3, wherein the digital signal processor is further configured to:
configure the at least one power amplifier block to select the one of the plurality of power amplifiers indicated by the configuration, the at least one mixer block to select the one of the plurality of mixers indicated by the configuration, and the at least one local oscillator block to select the one of the plurality of local oscillators indicated by the configuration.

5. The configurable transmitter apparatus of claim 4, wherein the at least one local oscillator block further comprises a plurality of elements that are programmable by at least one of a voltage source, a current source, or a capacitance source.

6. The configurable transmitter apparatus of claim 5, wherein the digital signal processor is further configured to adjust the at least one local oscillator block by programming at least one of the plurality of elements of the at least one local oscillator block.

7. The configurable transmitter apparatus of claim 1, wherein the digital signal processor is further configured to receive the indication of the modulation scheme from a baseband processor.

8. A method for configuring a transmitter, the method comprising:
receiving, by a digital signal processor (DSP), an indication of a modulation scheme that will be used to modulate data transmitted by a transmitter that comprises a plurality of blocks including a power amplifier block comprising a plurality of power amplifiers and a mixer block comprising a plurality of mixers;
retrieving, by the DSP, a configuration of the plurality of blocks of the transmitter from a memory based on the indication of the modulation scheme, wherein the configuration is indicative of one of the plurality of power amplifiers and one of the plurality of mixers; and
configuring, by the DSP, the plurality of blocks of the transmitter in accordance with the configuration retrieved from the memory.

9. The method of claim 8, wherein the plurality of blocks of the transmitter further comprises at least one local oscillator block comprising a plurality of different local oscillators.

10. The method of claim 9, wherein the configuration of the plurality of blocks of the transmitter is further indicative of one of the plurality of local oscillators.

11. The method of claim 10, wherein the configuring, by the DSP, the plurality of blocks of the transmitter in accordance with the configuration retrieved from the memory further comprises:
configuring, by the DSP, the at least one power amplifier block to select the one of the plurality of power amplifiers indicated by the configuration, the at least one mixer block to select the one of the plurality of mixers indicated by the configuration, and the at least one local oscillator block to select the one of the plurality of local oscillators indicated by the configuration.

12. The method of claim 10, wherein the at least one local oscillator block further comprises a plurality of elements that are programmable by at least one of a voltage source, a current source, or a capacitance source.

13. The method of claim 12, wherein the configuring, by the DSP, the plurality of blocks of the transmitter in accordance with the configuration retrieved from the memory further comprises programming at least one of the plurality of elements of the local oscillator block.

14. The method of claim 8, further comprising:
determining, by the DSP, a plurality of configurations of the plurality of blocks of the transmitter;
generating, by the DSP, a modulated data signal that is modulated in accordance with the modulation scheme;
configuring, by the DSP, the plurality of blocks of the transmitter in accordance with each of the plurality of configurations of the plurality of blocks of the transmitter and injecting, by the DSP, the modulated data signal into the transmitter for each of the plurality of configurations of the plurality of blocks of the transmitter;
receiving, by the DSP, monitoring information for each of the plurality of configurations of the plurality of blocks of the transmitter;
determining, by the DSP, an error vector magnitude (EVM) of the transmitter for each of the plurality of configurations of the plurality of blocks of the transmitter based on the monitoring information received for each of the plurality of configurations of the plurality of blocks of the transmitter; and
storing, by the DSP, the configuration of the plurality of blocks of the transmitter that satisfies an EVM threshold with a smallest power consumption.

15. The method of claim 14, further comprising:
determining, by the DSP, a plurality of configurations of a plurality of receiver blocks that are communicatively coupled to the DSP;
configuring, by the DSP, the plurality of receiver blocks based at least on each of the plurality of configurations of the plurality of receiver blocks, and receiving the modulated signal by each of the plurality of configurations of the plurality of receiver blocks;
receiving, by the DSP, receiver monitoring information for each of the plurality of configurations of the plurality of receiver blocks;
determining, by the DSP, a bit error rate (BER) of the modulated data signal received by each of the plurality of configurations of the plurality of receiver blocks based at least on the receiver monitoring information received for each of the plurality of configurations of the plurality of receiver blocks; and
configuring, by the DSP, the plurality of receiver blocks based at least on the configuration of the plurality of receiver blocks that satisfies a BER threshold with a lowest power consumption.

16. The method of claim 15, further comprising:
determining, by the DSP, at least one of the plurality of receiver blocks that is not used in the configuration of the plurality of receiver blocks that satisfies the BER threshold;
configuring, by the DSP, the at least one of the plurality of receiver blocks to monitor at least one of the plurality of configurations of the plurality of blocks of the transmitter; and
receiving, by the DSP, the monitoring information for the at least one of the plurality of configurations of the plurality of blocks of the transmitter from the at least one of the plurality of receiver blocks.

17. The method of claim 15, wherein at least one of the modulated data signals injected into the transmitter for each of the plurality of configurations of the plurality of blocks of the transmitter is received by each of the plurality of configurations of the plurality of receiver blocks.

18. The method of claim 17, wherein a first modulated data signal is received by a first configuration of the plurality of receiver blocks by leakage through a package that contains the transmitter and the plurality receiver blocks and a second modulated data signal is received by a second configuration of the plurality of receiver blocks through an antenna coupled to the plurality of receiver blocks.

19. The method of claim 15, further comprising:
providing the modulated signal, by the DSP, to each of the plurality of configurations of the plurality of receiver blocks.

20. A computer program product comprising instructions stored in a tangible computer-readable storage medium, the instructions comprising
instructions for receiving an indication of a modulation scheme that will be used to modulate data transmitted by a transmitter that comprises a plurality of blocks including a plurality of power amplifiers and a plurality of mixers;
instructions for retrieving a configuration of a plurality of blocks of the transmitter from a memory based on the indication of the modulation scheme, wherein the configuration is indicative of at least one of the plurality of power amplifiers or at least one of the plurality of mixers; and
instructions for configuring the plurality of blocks of the transmitter in accordance with the configuration retrieved from the memory.

* * * * *